US012775971B2

(12) United States Patent
Lim et al.

(10) Patent No.: US 12,775,971 B2
(45) Date of Patent: Oct. 27, 2026

(54) RECOMMENDATION OF PRODUCTS VIA POPULATION OF A SPARSE DATA MATRIX

(71) Applicant: Salesforce, Inc., San Francisco, CA (US)

(72) Inventors: John Lim, Cambridge, MA (US); Keld Lundgaard, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 461 days.

(21) Appl. No.: 17/973,174

(22) Filed: Oct. 25, 2022

(65) Prior Publication Data

US 2024/0135422 A1 Apr. 25, 2024
US 2024/0232975 A9 Jul. 11, 2024

(51) Int. Cl.
*G06Q 30/00* (2023.01)
*G06Q 30/0251* (2023.01)
*G06Q 30/0601* (2023.01)

(52) U.S. Cl.
CPC ..... *G06Q 30/0631* (2013.01); *G06Q 30/0255* (2013.01)

(58) Field of Classification Search
CPC ....................... G06Q 30/0631; G06Q 30/0255
See application file for complete search history.

(56) References Cited

U.S. PATENT DOCUMENTS 5,577,188 A 11/1996 Zhu
5,608,872 A 3/1997 Schwartz et al.
5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
(Continued)

OTHER PUBLICATIONS

"Solving Cold-Start Problem in Large-scale Recommendation Engines: A Deep Learning Approach," by Jianbo Yuan, Walid Shalaby, Mohammed Korayem, David Lin, Khalifeh AlJadda, and Jiebo Luo, 2016 IEEE International Conference on Big Data (Big Data) (Year: 2016).*
(Continued)

*Primary Examiner* — Anne M Georgalas
(74) *Attorney, Agent, or Firm* — Holland & Hart, LLP.

(57) ABSTRACT

A recommendation service access a data matrix listing of products associated with product profiles, the data matrix having product entries that store sparse historical electronic activity. For a target product it is determined which other products should be used to boost the historical electronic activity of the target product based on a first subset of product profiles that share product characteristics with the target product. Similarity scores are computed between the product profile of the target product and the first subset of product profiles to identify a second subset of one or more products having a similarity score above a scoring threshold. The historical electronic activity of the target product is boosted using the historical electronic activity of the other products in the second subset. Association values are calculated between the target product and the other products in the second subset by based on the boosted activity.

17 Claims, 4 Drawing Sheets

(56) References Cited

U.S. PATENT DOCUMENTS 5,918,159 A 6/1999 Fomukong et al.
5,963,953 A 10/1999 Cram et al.
5,983,227 A 11/1999 Nazem et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,133 B1 4/2001 Masthoff
6,216,135 B1 4/2001 Brodersen et al.
6,233,617 B1 5/2001 Rothwein et al.
6,236,978 B1 5/2001 Tuzhilin
6,266,669 B1 7/2001 Brodersen et al.
6,288,717 B1 9/2001 Dunkle
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,411,949 B1 6/2002 Schaffer
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec et al.
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshavsky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
6,907,566 B1 6/2005 McElfresh et al.
7,062,502 B1 6/2006 Kesler
7,069,231 B1 6/2006 Cinarkaya
7,069,497 B1 6/2006 Desai
7,100,111 B2 8/2006 McElfresh et al.
7,181,758 B1 2/2007 Chan
7,269,590 B2 9/2007 Hull et al.
7,289,976 B2 10/2007 Kihneman et al.
7,340,411 B2 3/2008 Cook
7,356,482 B2 4/2008 Frankland et al.
7,373,599 B2 5/2008 McElfresh et al.
7,401,094 B1 7/2008 Kesler
7,406,501 B2 7/2008 Szeto et al.
7,412,455 B2 8/2008 Dillon
7,454,509 B2 11/2008 Boulter et al.
7,508,789 B2 3/2009 Chan
7,599,935 B2 10/2009 La Rotonda et al.
7,603,331 B2 10/2009 Tuzhilin et al.
7,603,483 B2 10/2009 Psounis et al.
7,620,655 B2 11/2009 Larsson et al.
7,644,122 B2 1/2010 Weyer et al.
7,668,861 B2 2/2010 Steven
7,698,160 B2 4/2010 Beaven et al.
7,730,478 B2 6/2010 Weissman
7,747,648 B1 6/2010 Kraft et al.
7,779,039 B2 8/2010 Weissman et al.
7,779,475 B2 8/2010 Jakobson et al.
7,827,208 B2 11/2010 Bosworth et al.
7,853,881 B1 12/2010 Aly Assal et al.
7,945,653 B2 5/2011 Zukerberg et al.
8,005,896 B2 8/2011 Cheah
8,014,943 B2 9/2011 Jakobson
8,015,495 B2 9/2011 Achacoso et al.
8,032,297 B2 10/2011 Jakobson
8,073,850 B1 12/2011 Hubbard et al.
8,082,301 B2 12/2011 Ahlgren et al.
8,095,413 B1 1/2012 Beaven
8,095,531 B2 1/2012 Weissman et al.
8,095,594 B2 1/2012 Beaven et al.
8,103,611 B2 1/2012 Tuzhilin et al.
8,150,913 B2 4/2012 Cheah
8,209,308 B2 6/2012 Rueben et al.
8,209,333 B2 6/2012 Hubbard et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
9,959,563 B1 * 5/2018 Wu .................... G06Q 30/0631
10,445,742 B2 * 10/2019 Prendki .............. G06Q 30/0601
11,556,966 B2 * 1/2023 Rahman .................. H04L 67/10
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.
2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.

(56) References Cited

U.S. PATENT DOCUMENTS

| | | | | |
|---|---|---|---|---|
| 2004/0260659 | A1 | 12/2004 | Chan et al. | |
| 2004/0268299 | A1 | 12/2004 | Lei et al. | |
| 2005/0050555 | A1 | 3/2005 | Exley et al. | |
| 2005/0091098 | A1 | 4/2005 | Brodersen et al. | |
| 2008/0249972 | A1 | 10/2008 | Dillon | |
| 2009/0063415 | A1 | 3/2009 | Chatfield et al. | |
| 2009/0100342 | A1 | 4/2009 | Jakobson | |
| 2009/0177744 | A1 | 7/2009 | Marlow et al. | |
| 2011/0218958 | A1 | 9/2011 | Warshavsky | |
| 2011/0247051 | A1 | 10/2011 | Bulumulla | |
| 2012/0042218 | A1 | 2/2012 | Cinarkaya | |
| 2012/0233137 | A1 | 9/2012 | Jakobson et al. | |
| 2012/0290407 | A1 | 11/2012 | Hubbard et al. | |
| 2013/0212497 | A1 | 8/2013 | Zelenko et al. | |
| 2013/0218948 | A1 | 8/2013 | Jakobson | |
| 2013/0218949 | A1 | 8/2013 | Jakobson | |
| 2013/0218966 | A1 | 8/2013 | Jakobson | |
| 2013/0247216 | A1 | 9/2013 | Cinarkaya | |
| 2014/0129376 | A1* | 5/2014 | Kamimaeda | G06Q 30/02 705/26.7 |
| 2014/0359537 | A1 | 12/2014 | Jackobson et al. | |
| 2016/0110646 | A1* | 4/2016 | Somekh | G06N 20/00 706/46 |
| 2017/0132509 | A1* | 5/2017 | Li | G06N 3/042 |
| 2017/0140262 | A1* | 5/2017 | Wilson | G06N 3/02 |
| 2018/0047071 | A1* | 2/2018 | Hsu | G06Q 30/0282 |
| 2018/0218428 | A1* | 8/2018 | Xie | G06Q 10/067 |
| 2019/0251435 | A1* | 8/2019 | Shiebler | G06F 17/16 |
| 2020/0026772 | A1* | 1/2020 | Wheeler | G06F 16/248 |
| 2021/0097471 | A1* | 4/2021 | Inamdar | G06N 20/00 |
| 2021/0110455 | A1 | 4/2021 | Lundgaard | |
| 2021/0233150 | A1* | 7/2021 | Korpeoglu | G06Q 30/0631 |
| 2021/0233151 | A1* | 7/2021 | Rahman | G06Q 30/0629 |
| 2022/0027776 | A1* | 1/2022 | Trenkle | H04N 21/26603 |
| 2022/0245702 | A1* | 8/2022 | Sundaresan | G06N 20/00 |
| 2022/0284382 | A1* | 9/2022 | Demizu | G06Q 30/0202 |

OTHER PUBLICATIONS

"Real Estate Recommendation Approach for Solving the Item Cold-Start Problem," by Jirut Polohakul, Ekapol Chuangsuwanick, and Proadpran Punyabukkana, IEEE Access, vol. 9, 2021 (May 13, 2021) (Year: 2021).*

"Deep transfer learning with multimodal embedding to tackle cold-start and sparsity issues in recommendation system," by Syed Irteza Hussain Jafri, Rozaida Ghazali, Irfan Javid, Zahid Mahmood, Abdullahi Abdi Abubakar Hassan, PLoS ONE, 17(8), e0273486, Aug. 25, 2022 (Year: 2022).*

* cited by examiner

RECOMMENDATION OF PRODUCTS VIA POPULATION OF A SPARSE DATA MATRIX

BACKGROUND ART

One conventional technique of making product recommendations is to use a data matrix that describes the relatedness of different products based on the historical electronic activity of users. The data matrix has entries with association values that indicate how related one product in the matrix is to another product in the matrix. The association value indicates how related two products are based on historical electronic activity (e.g., clicks, counts, purchases, etc.), but not how similar the two products are. For example, the association value can measure a relationship between two unrelated products such as a baseball bat and a pair of tennis shoes. The historical electronic activity between different products can be compared so that recommendations can be made based on these associations. However, in some circumstances, the data matrix may have insufficient historical electronic activity for a particular product, and therefore the product has little to no associations. Stated differently, in a sparse data matrix, there may be sufficient historical electronic activity to provide reliable association values for only some of the product entries, but not for all the product entries. Without correction, the same products will be continue to be recommended since the products with little or no historical electronic activity (e.g., new products) have insufficient historical electronic activity to provide a reliable association value.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations to a system for making recommendations to users regarding products. The techniques described here may be implemented to resolve the sparse data matrix problem. In particular, the recommendation techniques use the historical electronic activity of similar products to determine an association between the product with a sparse entry and other products in order to make recommendation. To correct the sparse data matrix problem, subsets of products that share characteristics are first aggregated with one another. For example, a machine-learning network may be used to aggregate products sharing characteristics, such as aggregating all the soaps in a subset or all bathroom products in a subset. Next, for each subset, the same or different machine-learning network is used to determine similarity values between different pairs of products in the subset. The similarity values indicate how similar one product is to another product (e.g., in a subset of soaps, scented soaps have high similarity values with one another). Subsequently, the historical electronic activity of the most similar products within the subset are copied into the data entry of a product having insufficient historical electronic activity. Association values are then calculated based on the copied historical electronic activity. These calculated association values can be used to determine product recommendations.

Figure 1:
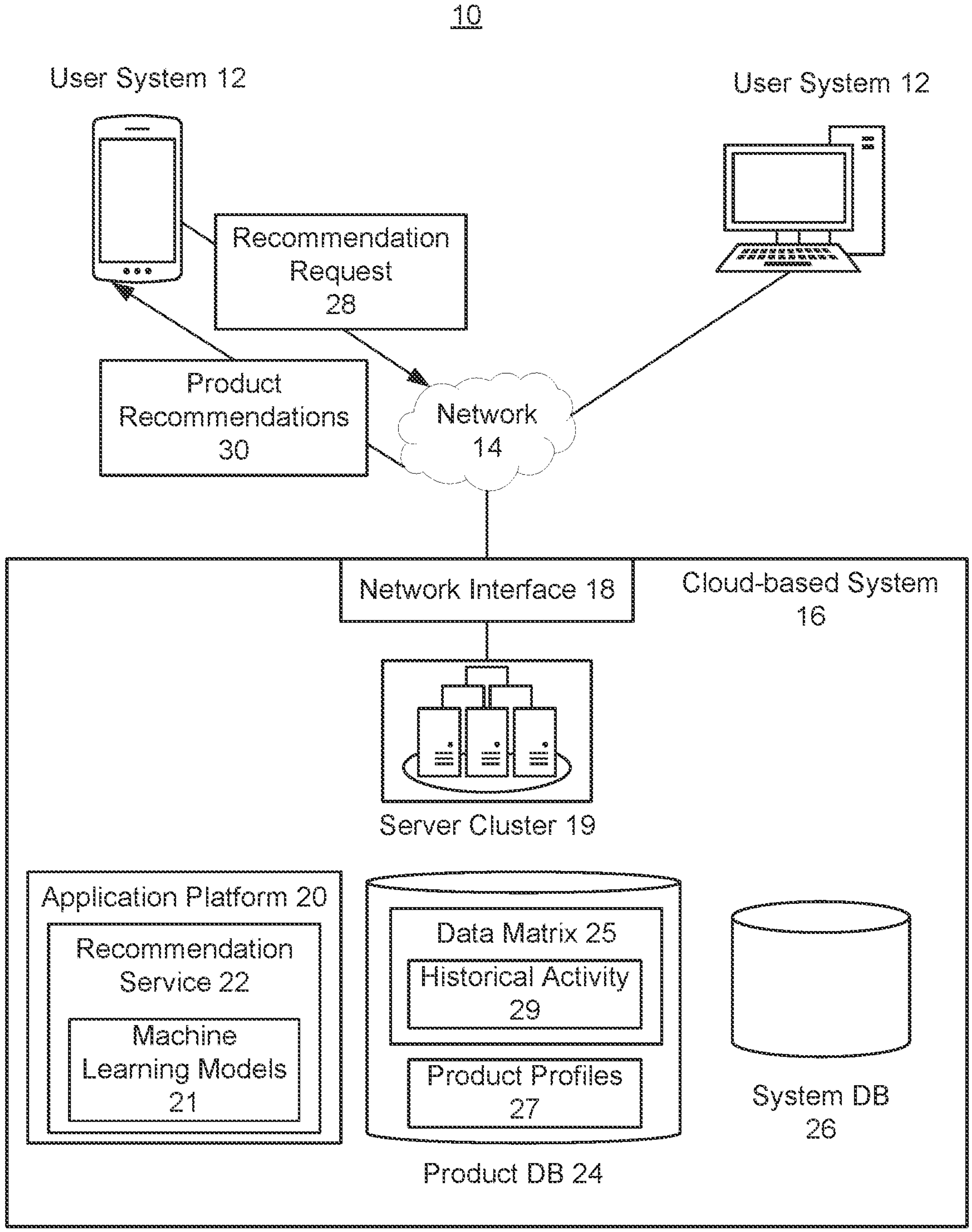
FIG. 1 shows a block diagram of an example of an environment for generating recommendations related to products, in accordance with some implementations.

FIG. 1 shows a block diagram of an example of an environment 10 for generating recommendations related to products, in accordance with some implementations. The environment 10 includes user systems 12 in electronic communication via a network 14 with a cloud-based system 16. The cloud-based system 16 may comprise, a network interface 18, a server cluster 19 comprising multiple servers, an application platform 20, a product database 24 that stores product data including a data matrix 25, and a system database 26 that stores system data including program code for implementing various functions of the system 16. In some other implementations, environment 10 may not have all of these components or systems, or may have other components or systems instead of, or in addition to, those listed above.

The application platform 20 can be a framework that allows one or more applications of the cloud-based system 16, such as recommendation service 22, to execute on the hardware and software infrastructure of the cloud-based system 16. In some implementations, the application platform 20 may enable the creation, management and execution of the product recommendation service 22 and user access of the recommendation service 22 via the user systems 12.

The cloud-based system 16 may represent any type of web-based system such as an online store, a search engine, or a system as a service (SAAS) service, for example. In one specific implementation, the system 16 may comprise a web-based customer relationship management (CRM) system. For example, data for multiple tenants may be stored in the same physical database object. In some such implementations, the system 16 includes application servers configured to implement and execute software applications as well as provide related data, code, forms, renderable web pages and documents and other information to and from user systems 12 and to store to, and retrieve from, a database system related data, objects, and Web page content. The system 16 can provide tenant access to multiple hosted (standard and custom) applications, including the recommendation service 22, through network 14 and the user systems 12. The term "server" is meant to refer to a computing device or system, including processing hardware and process space(s), an associated storage medium such as a memory device or database, and, in some instances, a database application (for example, OODBMS or RDBMS) as is well known in the art. It should also be understood that "server cluster" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, the user systems 12 can include an HTTP client commonly referred to as a "web browser" or simply a "browser" for sending and receiving HTTP signals to and from an HTTP server of the system 16. Such an HTTP server can be implemented as the sole network interface 18 between the system 16 and the network 14, but other techniques can be used in addition to or instead of these techniques. In some implementations, the network interface 18 between the system 16 and the network 14 includes load sharing functionality, such as round-robin HTTP request distributors to balance loads and distribute incoming HTTP requests evenly over a number of servers. In some implementations, each of the servers can have access to the stored data; however, other alternative configurations may be used instead.

The system 16 includes tangible computer-readable media having non-transitory instructions stored thereon/in that implement the recommendation service 22 and are executable by the server cluster 19 or other computing system to perform some of the implementation of processes described herein. For example, the application platform 20 and/or the system database may include computer program code comprising instructions for operating and configuring the cloud-based system 16 as described herein. In some implementations, the recommendation service 22 and other computer code can be stored on a hard disk, but also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the recommendation service 22 and other computer code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that comprising the recommendation service 22 can be written in any programming language such as, for example, C, C++, HTML, any other markup language, Java™, JavaScript, ActiveX, or any other scripting language, such as VBScript, and many other programming languages as are well known may be used.

The recommendation service 22 enables users of the system 16 to request recommendations, which are primarily for products, but could also apply to services in other implementations. In some implementations, the recommendation service 22 may be provided as an on-demand service to the users or as a subscription service. In one implementation, products may be physical products offered for sale by an ecommerce site or a retailer. In another implementation, the products may be software products or services offered by the cloud-based system.

Figure 2:
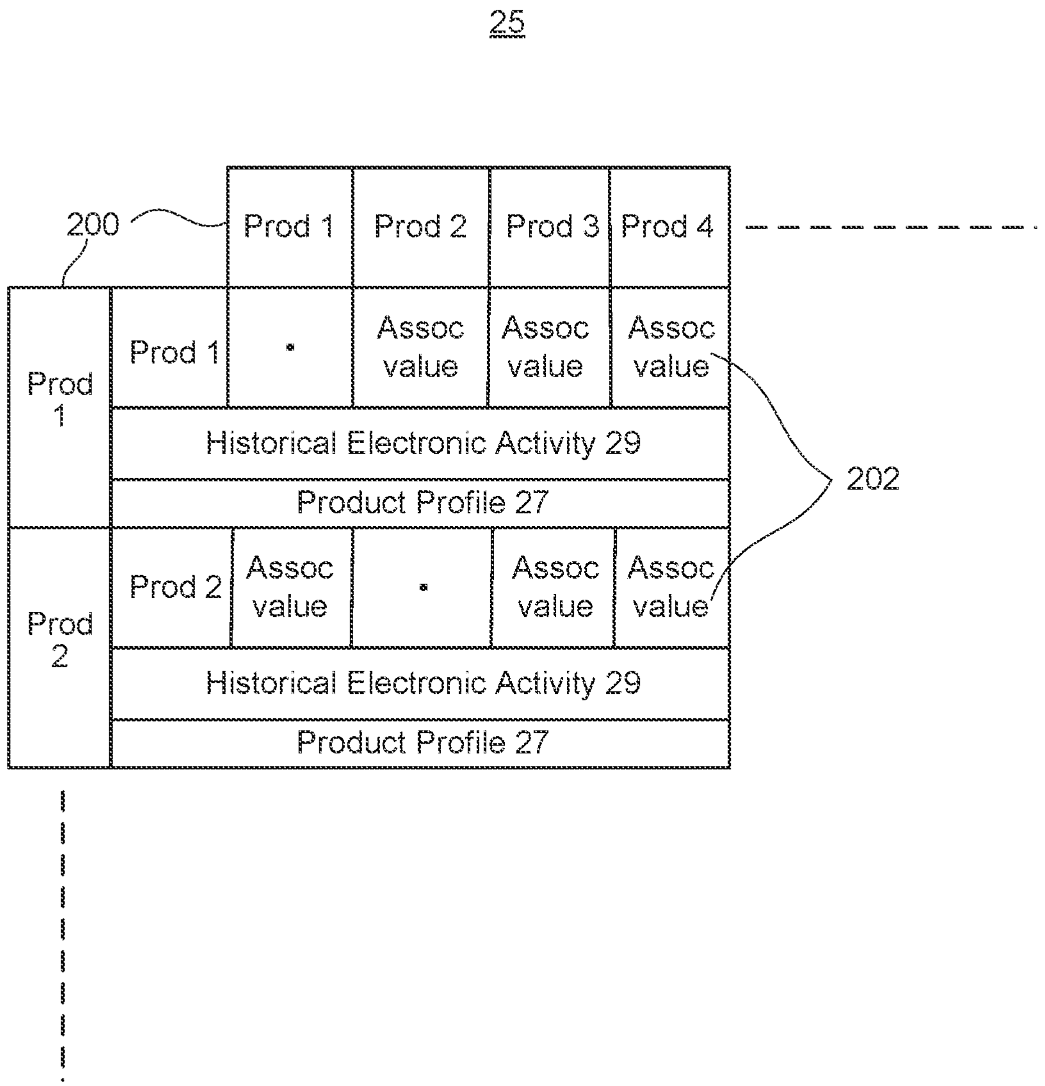
FIG. 2 illustrates a diagram of the data matrix according to one example implementation.

FIG. 2 illustrates a diagram of the data matrix 25 according to one example implementation. The data matrix 25 may be implemented as a product-to-product activity matrix, where a set of products identifiers 200 are listed along the rows as well as the columns of the matrix. Each of the products listed in the data matrix 25 may have one or more entries that store historical electronic activity 29 of various users related to the respective product. Additionally or alternatively, the historical electronic activity 29 of various users regarding the products may be stored in another data structure or database. The historical electronic activity 39 can include online user activity, such as any combination of clicks, view counts, and purchases related to a product, as well as another product viewed or actually purchased in the same session. "Clicking" on a product may refer to user activity such as adding the product to an electronic shopping basket, purchasing the product, viewing the product, adding the product to a list of future items to be purchased and/or a wish list, or the like.

Each of the listed products may further include a product profile 27 associated with the product that describes the product. In one example implementation, the products listed in the data matrix 25 may include one or more entries that store or reference the product profile 27. The product profiles 27 may be stored within the data matrix 25 or external to the data matrix 25. In the case where the product profiles 27 are stored external to the data matrix 25, the product profile entry for each listed product may comprise a link to the external product profiles 27. The product profiles 27 contain product descriptions for the respective product. The product descriptions primarily comprise text, but may also comprise images, videos, and audio recordings.

At the row/column intersections of pairs of products of the data matrix 25, the data matrix 25 further includes entries that store an association value 202 indicating how related one product in the pair is to the other product. The association value 202 may indicate how related two products are based on the historical electronic activity (e.g., clicks, counts, purchases, etc.), but not how similar the two products are. For example, the association value 202 can measure a relationship between two unrelated products such as a baseball bat and a pair of tennis shoes based on user activity.

In further implementations, the historical electronic activity 29 may be grouped by session and/or by time (e.g, hours, days, weeks, etc.). For each interaction session over a predetermined period of time, the recommendation service 22 may determine the different products that the user interacted with, and create pairwise association value scores with the other products listed in the data matrix. For each product, the recommendation service 22 may generate a sorted list of other products that may compliment the target product by using the pairwise association values 202. For further information regarding generation of the data matrix 25, refer to U.S. Patent Publication US20210110455A1 "Systems and Methods of Items That Generation in an Electronic Catalog", which is incorporated herein by reference.

In one implementation, access to the data matrix 25 and/or the product profiles 27 may be managed by a relational database management system (RDBMS) or the equivalent to execute storage and retrieval of information against the database object(s). For example, in one limitation the data matrix 25 may store information from one or more products in tables of a common database image to form a multi-product database system (MPS). The term "multi-product database system" can refer to those systems in which various elements of hardware and software of a database system are shared by users in order to track user input related to the products in order to generate the product recommendations 30 based on the user input.

In operation, the recommendation service 22 may receive product recommendation requests 28 from the user systems 12 over network 14. The data matrix 25 is used by the recommendation service 22 to generate product recommendations 30 based on the historical electronic activity 29 and the association values 202 among the products.

The historical electronic activity 29 between different products can be compared so that recommendations can be made based on these associations. However, in some circumstances, the data matrix 25 may have insufficient historical electronic activity for a particular product, and therefore the product has little to no associations. Stated differently, in a sparse data matrix, there may be sufficient historical electronic activity to provide reliable association values for only some of the product entries, not for all the product entries. Without correction, the same products will be continue to be recommended since the products with little or no historical electronic activity (e.g., new products) have insufficient historical electronic activity to provide a reliable association value.

According to the disclosed implementations, the recommendation service 22 uses the historical electronic activity of similar products to determine an association between the product with a sparse entry and other products in order to make recommendation. To correct the sparse data matrix problem, the recommendation service 22 implements an improved collaborative filtering process performed at least in part by the machine learning models 21 to generate product recommendations 30 based on the historical electronic activity 29 and the association values 202 among the products. Subsets of products that share characteristics are first aggregated with one another. For example, the machine-learning models 21 may be used to aggregate products sharing characteristics, such as aggregating all the soaps in a subset or all bathroom products in a subset.

Next, for each subset, the same or different machine-learning models 21 are used to determine similarity values between different pairs of products in the subset. The similarity values indicate how similar one product is to another product (e.g., in a subset of soaps, scented soaps have high similarity values with one another). For example, the machine learning models 21 embed the product profiles 27 into an embedding space by transforming the text and images in the product profiles 27 into respective fixed-dimensional vectors. Values within the vectors encompass some semantic meaning and distances between the vectors within embedding space can be calculated to derive similarity scores, where vectors closer together in the vector space indicate similarity between the corresponding products.

Subsequently, the recommendation service 22 boosts the historical electronic activity of target products within the subset that have sparse historical electronic activity using the historical electronic activity of the other products in the subset. This may be done by copying the historical electronic activity of the other products into the data entries of the target products. In one implementation, the boosting contribution for a given product can be weighted based on the similarity scores between that product and the target product. Association values between the target product and another product can then be calculated or recalculated by comparing the boosted historical electronic activity of the target product and the historical activity of the other product. The recommendation service 22 may then generate and send product recommendations 30 based on the association values in the data matrix 25, as described further below.

Figure 3:
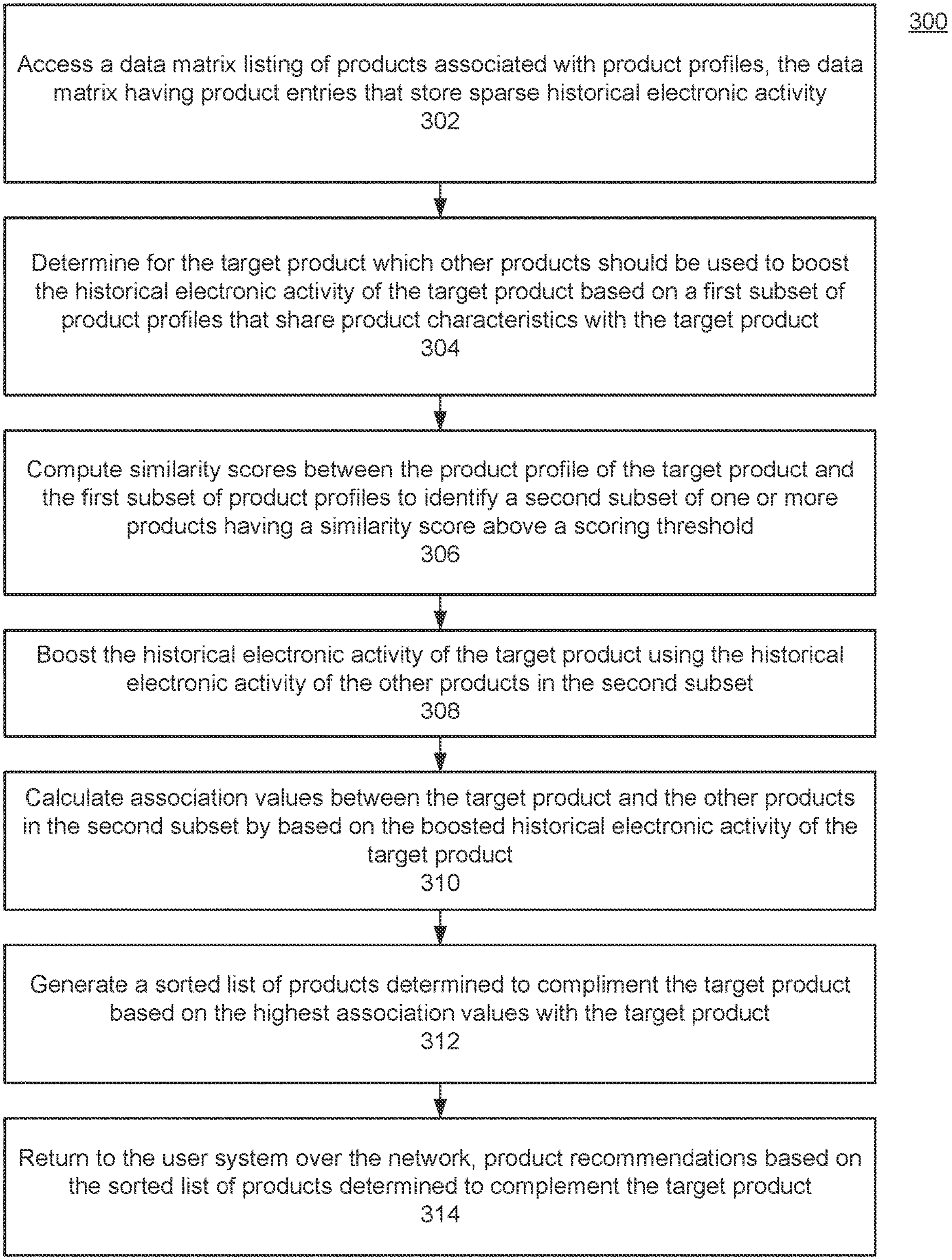
FIG. 3 is a flow diagram illustrating an example of a process performed the product recommendation service to generate product recommendations for users, in accordance with some implementations.

FIG. 3 is a flow diagram illustrating an example of a process 300 performed the product recommendation service 22 when executed by the server cluster 19 to generate product recommendations for users, in accordance with some implementations. The product recommendation service 22 addresses sparsity in the historical electronic activity of the data matrix 25 where some, if not a majority, of the entries in the data matrix are non-existent (e.g., a new entries) or below a predetermined threshold, by automatically adding density to those entries by aggregating the historical electronic activity from products that share similar characteristics.

At block 302, the recommendation service 22 accesses from a database a data matrix 25 comprising a listing of products that are associated with product profiles, the data matrix having product entries that store historical electronic activity of various users related to the respective products, and where the historical electronic activity for a target product is below a threshold (i.e., sparse). The threshold value for historical electronic activity is application dependent, but is related to when the historical electronic activity is insufficient to provide a reliable recommendation. Example threshold values could be 25, 50 or 100 of less of use electronic activity.

At block 304, the recommendation service 22 determines which other products should be used to boost (i.e., increase) the historical electronic activity data of the target product by inputting the product profiles into one or more machine learning networks 21 that identify a first subset of product profiles that share product characteristics with the product profile of the target product.

Given a target product, the machine learning networks 21 are trained to identify the first subset of other products in the data matrix 25 whose product profiles 27 (e.g., text description, images, and the like) share the same or similar product characteristic values. For example, machine learning networks 21 may determine that a product profile for a bat A shares the same or similar product characteristics with product profiles for a bat B, glove C, and gloves D. In some implementations, the machine learning models 21 may comprise multi-label classification models that classify instances into multiple labels. Some example types of classification algorithms or models that may be used include k-nearest neighbors, decision trees, kernel methods for vector output, and neural networks.

In some implementations, the machine learning models 21 may determine the product characteristics. Additionally or alternatively, example product characteristics that may be associated with the product profiles may include category labels, and the age and gender of users who have historical electronic activity with the product. However, many other characteristics may be included. For products, additional information could include price, while for the users, additional characteristics could include, for example user roles, employer, geographic origin, and the like.

At block 306, in order to weigh each product's contribution when aggregating information, the machine learning networks 21 are used to compute similarity scores between the product profile of the target product and the subset of product profiles, and to identify a second subset of one or more products having a similarity score above a scoring threshold (e.g., 85, 90, 95%, and the like). The similarity score is a measure of how related one product is to another. The intent is that a product should share more of its information with the neighbors to which the product is most similar.

In some embodiments, the similarity scores may be determined based on the product descriptions and images for the products from the product profiles 27. The product descriptions may be used as input into one or more machine learning models 21 to generate the similarity score based on a semantic similarity between the product description of the target product and the product descriptions for the other products. In some embodiments, the product descriptions typically comprise text but may also comprise images, videos and audio recordings.

At block 308, the recommendation service 22 boosts the historical electronic activity of the target product using the historical electronic activity of the other products in the second subset. In one implementation, the historical electronic activity of the other products in the second subset are copied into a product entry of the target product that stores the historical electronic activity for that product. Where the product entries in the data matrix 25 include a product activity row that stores the historical electronic activity, this can be accomplished by copying the activity row of the products having the highest similarity score into the activity row of the target product. In a further implementation, the boosting contribution of the historical electronic activity copied from a given product can be weighted based on the similarity score between that product and the target product. For example, if the similarity score between the target product and product A is 95% and the similarity score between the target product and product B is 87%, then the copied historical electronic activity of product A is assigned a weight of 95% and the copied historical activity of product B is assigned a weight of 87%.

This process may include additional processing and thresholding of actual numbers in the copied historical electronic activity in the activity row of the target product based on predefined parameters. For example, the process may use tuned parameters to determine the boosting strength of a product. Some target products need a lot of boosting help and others may not need any boosting. Products that do not have sufficient historical activity will need lots of boosting and products with lots of historical activity will not need boosting. To determine this, some threshold can be defined indicating a minimum amount of activity a product will need have before boosting is necessary. If products meet this threshold, the system will not boost the historical electronic activity. If products are below this threshold, the system will boost the historical electronic activity.

Additionally or alternatively, the recommendation engine can calculate the average historical electronic activity across the products having the highest similarity scores. This is averaged by a weighted average. The weights may be scaled by the similarity score. For example, assumer there is a target product, A, and three products, B, C, and D, with similarity scores of 0.9, 0.8. and 0.7, respectively. The system can calculated the average historical electronic activity by multiplying the historical electronic activity of each of the three products by its similarity score with the target product, A. Once each of the three product's historical activity has been scald with its similarity score, the average is computed by summing up the scaled scores and dividing by 3. The historical electronic activity of the target product can then be boosted using the average historical electronic activity.

The contribution may be boosted to a first level, while the historical electronic activity of the target product itself is boosted to a second level. Both the target product and the contribution's historical activity may meet some threshold. If this threshold is not met, the system will further artificially boost the historical activity of the target product. This is to ensure that the minimum amount of historical electronic activity is at a certain level. If the amount of historical electronic activity for the target product too high, then the recommendation can become artificial, while if it is too low, the recommendation can become ineffective.

At block 310, the recommendation service 22 calculates association values between the target product and the other products in the second subset by comparing the boosted historical electronic activity of the target product to the historical activity of the other products. Association values between any products may be determined by counting the historical interactions (co-purchases, co-clicks, co-views, etc.) between any two products to measure an association between different pairs of products listed in the data matrix 25. The association values may be stored at the row/column intersections of pairs of products, as shown in FIG. 2.

In some implementations, prior to determining the association values between the target product and the other products in the second subset, the entries in the data matrix may include an original association values between the target product and the other products in the second subset. In this case, the association values may be recalculated.

At block 312, for at least the target product, the recommendation service 22 generates a sorted list of products determined to compliment the target product by identifying the products listed in the data matrix 25 having highest association values with the target product. In one implementation, the recommendation service 22 may select a predetermined number of products with the highest association values, e.g., the top 5, 8, 10 and the like products, or select the products with an association value above a predetermined threshold.

The recommendation service also uses the product's attributes (whether it is a t-shirt, jeans, coat, etc.) to generate recommendations and these association values may be tuned during offline experimentation. For example, assuming the target product is a t-shirt, another product with the highest association value may be a television. The recommendation service would not recommend this product if the goal is to recommend products that "complete the look", for instance. The system may have an internal set of rules that dictates which type of products can be recommended with one another.

At block 314, responsive to receiving a recommendation request 28 from the user system 12, the recommendation service 22 returns to the user system 12 over the network 14 product recommendations 30 based on the list of products determined to complement the target product. In one implementation, the recommendation request 28 is inferred based on user electronic activity, such as clicking on the target product in an advertisement or during an online shopping session. Alternatively or additionally, the recommendation request 28 may be received based on an explicit user request entered into a browser or an application, such as request to "find products similar to baseball glove A".

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
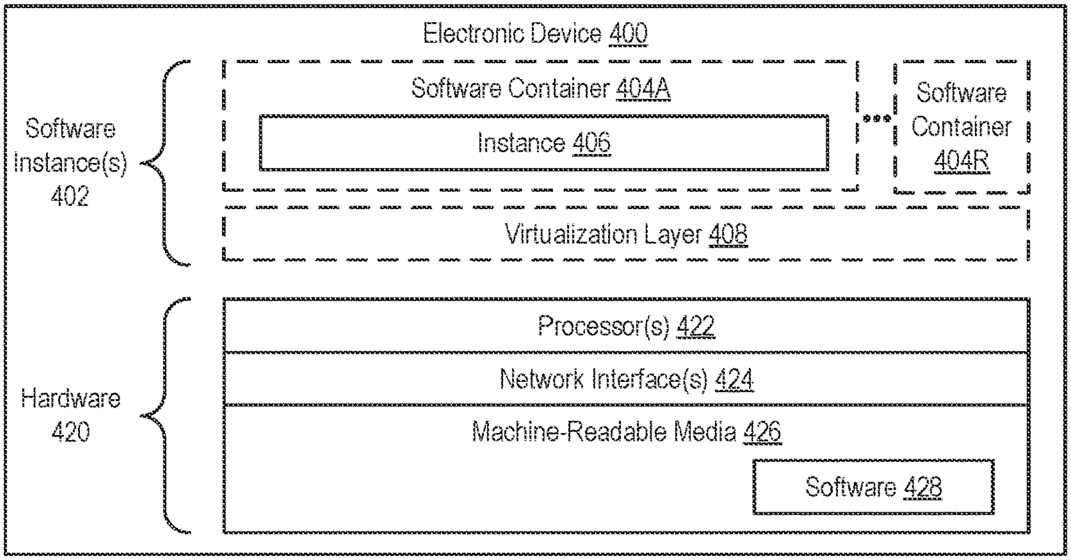
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 426 may include non-transitory and/or transitory machine-readable media. Each of the previously described user systems 12 and the recommendations service 22 may be implemented in one or more electronic devices 400. In one implementation: 1) each of the clients is implemented in a separate one of the electronic devices 400 (e.g., in end user devices where the software 428 represents the software to implement clients interfacing directly and/or indirectly with the recommendation service 22 (e.g., software 428 represents a web browser, a native client, a portal, a command-line interface, and/or an application programming interface (API) based upon protocols such as Simple Object Access Protocol (SOAP), Representational State Transfer (REST), etc.)); 2) the recommendation service 22 is implemented in a separate set of one or more of the electronic devices 400 (e.g., a set of one or more server devices where the software 428 represents the software to implement the recommendation service 22); and 3) in operation, the electronic devices implementing the clients and the recommendation service 22 would be communicatively coupled (e.g., by a network) and would establish between them (or through one or more other layers and/or or other services) connections for submitting configuration data to the recommendation service 22 and returning a software package to the clients. Other configurations of electronic devices may be used in other implementations (e.g., an implementation in which the client and the recommendation service 22 are implemented on a single one of electronic device 400).

During operation, an instance of the software 428 (illustrated as instance 406 and referred to as a software instance; and in the more specific case of an application, as an application instance) is executed. In electronic devices that use compute virtualization, the set of one or more processor(s) 422 typically execute software to instantiate a virtualization layer 408 and one or more software container(s) 404A-404R (e.g., with operating system-level virtualization, the virtualization layer 408 may represent a container engine (such as Docker Engine by Docker, Inc. or rkt in Container Linux by Red Hat, Inc.) running on top of (or integrated into) an operating system, and it allows for the creation of multiple software containers 404A-404R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-404R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer 408. In electronic devices where compute virtualization is not used, the instance 406 on top of a host operating system is executed on the "bare metal" electronic device 400. The instantiation of the instance 406, as well as the virtualization layer 408 and software containers 404A-404R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
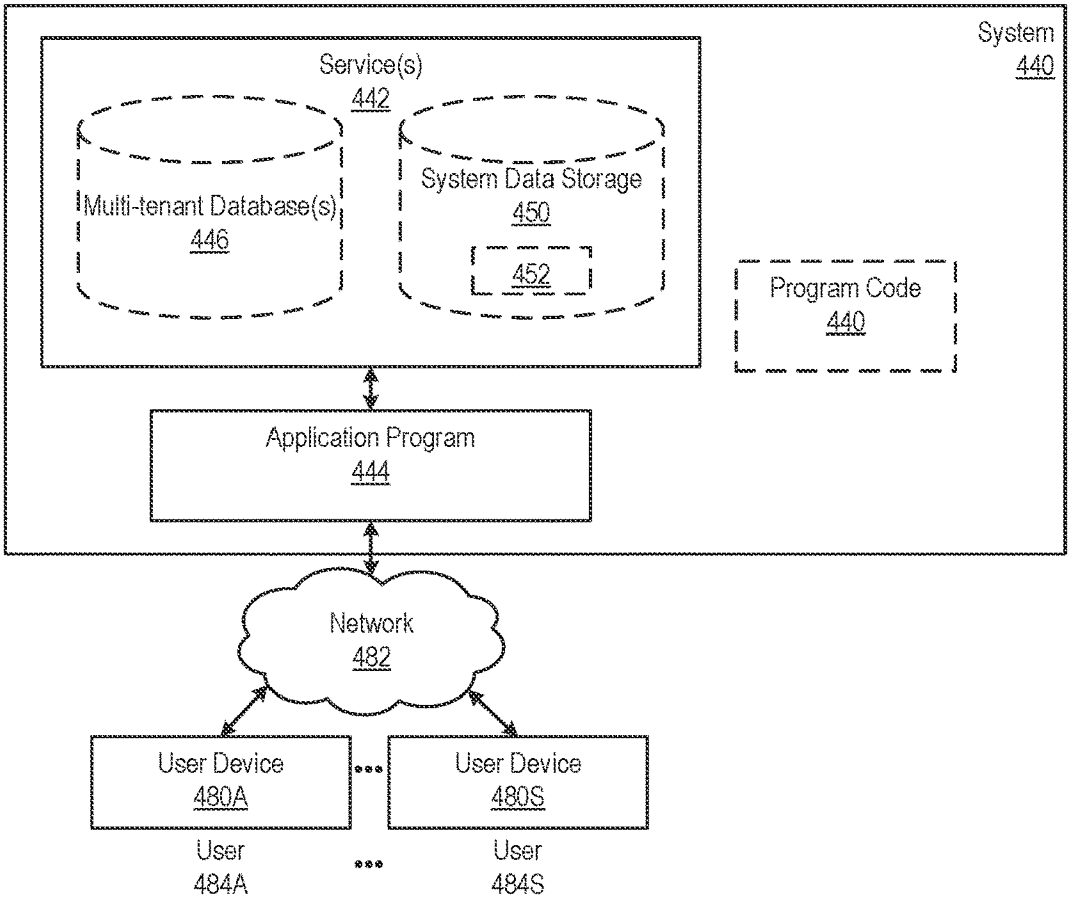
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the recommendation service 22. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 440 is coupled to user devices 480A-480S over a network 482. The service(s) 442 may be on-demand services that are made available to one or more of the users 484A-484S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-484S). The service(s) 442 may communicate with each other and/or with one or more of the user devices 480A-480S via one or more APIs (e.g., a REST API). In some implementations, the user devices 480A-480S are operated by users 484A-484S, and each may be operated as a client device and/or a server device. In some implementations, one or more of the user devices 480A-480S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Push upgrade system; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 440 may include an application platform 444 that enables PAAS for creating, managing, and executing one or more applications developed by the provider of the application platform 444, users accessing the system 440 via one or more of user devices 480A-480S, or third-party application developers accessing the system 440 via one or more of user devices 480A-480S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-480S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-480S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the recommendation service 22, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-480S.

Each user device 480A-480S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-484S to interact with various GUI pages that may be presented to the one or more of users 484A-484S. User devices 480A-480S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-480S might include an HTTP client, commonly referred to as a "browser," for sending and receiving HTTP messages to and from server(s) of system 440, thus allowing users 484A-484S of the user devices 480A-480S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for product recommendation by a server, comprising:

receiving, by the server and from a user via a user interface of a user system over a network, a recommendation request that comprises an indication of a target product and a request for at least one product that complements the target product;

accessing, by the server and from a database and in response to receiving the recommendation request from the user, a data matrix comprising a listing of products that are associated with product profiles, the data matrix, that is within the database, having product entries that store historical electronic activity of various users related to respective products within the listing of products;

automatically detecting, by the server in response to the recommendation request and based at least in part on accessing the data matrix, that the historical electronic activity for the target product is below a threshold; and initiating, automatically and by the server in response to detecting that the historical electronic activity for the target product is below the threshold, a process to increase a density of the historical electronic activity for the target product, wherein the process comprises:

identifying, by the server and based at least in part on inputting the product profiles of one or more other products, from the listing of products that are separate from the target product, into one or more machine learning models, a first subset of product profiles that share product characteristics with a product profile of the target product;

generating, by the server and via the one or more machine learning models, an embedding vector of the product profile of the target product and a set of embedding vectors of one or more product profiles within the first subset of product profiles;

computing, by the server and based at least in part on the one or more machine learning models generating the embedding vector and the set of embedding vectors, distances between the embedding vector of the product profile of the target product and the set of embedding vectors of the one or more product profiles within the first subset of product profiles to obtain similarity scores between the product profile of the target product and the first subset of product profiles, the similarity scores indicating a subset of products, from the one or more other products, corresponding to the product profiles in the first subset of product profiles that have respective similarity scores above a scoring threshold;

augmenting, by the server and at the database that stores the data matrix comprising the listing of products associated with the product profiles, the historical electronic activity of the target product with the historical electronic activity of products within the subset of products indicated based at least in part on the similarity scores to obtain an indication of boosted historical electronic activity of the target product wherein augmenting the target product and the historical electronic activity of the target product further comprises:

weighting a boosting factor for each product of the subset of products used to obtain the historical electronic activity of the target product based on the similarity score between the product and the target product; and copying, into a first product entry associated with the target product that is stored within the database, the historical electronic activity of the products in the subset of products that are stored in one or more second product entries within the database, and wherein the boosted historical electronic activity of the target product is obtained based at least in part on copying the historical electronic activity of the products in the subset of products into the first product entry;

calculating, by the server, association values between the augmented target product and the products in the subset of products that indicate a relationship between the augmented target product and the products in the subset of products, the association values being calculated based at least in part on a comparison between the boosted historical electronic activity of the augmented target product and the historical electronic activity of the products in the subset of products;

generating, by the server and for at least the augmented target product, a sorted list of products that complement the augmented target product, the sorted list of products including one or more products from the subset of products that have an association value with the augmented target product that are greater than or equal to an association value threshold; and returning, from the server and to the user interface of the user system over the network and in response to the recommendation request, product recommendations based at least in part on the sorted list of products that complement the augmented target product, the product recommendations indicating the one or more products with respective association values that satisfy the association value threshold and complement the augmented target product.

2. The method of claim 1, wherein:

the first product entry is from the product entries within the data matrix that is stored within the database, the first product entry associated with the target product stores the historical electronic activity of the target product, and copying the historical electronic activity of the products in the subset of products into the first product entry associated with the target product includes combining the historical electronic activity of the products in the subset of products with the historical electronic activity of the target product to obtain the boosted historical electronic activity.

3. The method of claim 1, further comprising using multi-label classification models as the one or more machine learning models, the multi-label classification models comprising at least one of k-nearest neighbors, decision trees, kernel methods for vector output, and neural networks.

4. The method of claim 1, wherein augmenting the historical electronic activity of the target product further comprises calculating an average historical electronic activity across the products within the subset of products from the one or more other products indicated via the first subset of product profiles that have a highest similarity score, and augmenting the historical electronic activity of the target product using the average historical electronic activity.

5. The method of claim 1, wherein receiving the recommendation request is based at least in part on inferring the recommendation request based at least in part on user electronic activity, including clicking on the target product in an advertisement or during an online shopping session.

6. The method of claim 1, wherein the recommendation request is received based at least in part on an explicit user request entered into a browser or an application.

7. An apparatus for product recommendation by a server comprising:

a set of one or more processors; and a non-transitory machine-readable storage medium that provides instructions that, if executed by the set of one or more processors, are configurable to cause the apparatus to perform operations to:

receive, by the set of one or more processors and from a user via a user interface of a user system over a network, a recommendation request that comprises an indication of a target product and a request for at least one product that complements the target product;

access, by the set of one or more processors and from a database and in response to receiving the recommendation request from the user, a data matrix comprising a listing of products that are associated with product profiles, the data matrix, that is within the database, having product entries that store historical electronic activity of various users related to respective products within the listing of products;

automatically detect, by the set of one or more processors in response to the recommendation request and based at least in part on accessing the data matrix, that the historical electronic activity for the target product is below a threshold; and initiate, by the set of one or more processors, automatically, and in response to detecting that the historical electronic activity for the target product is below the threshold, a process to increase a density of the historical electronic activity for the target product, wherein the process comprises:

identify, by the set of one or more processors and based at least in part on inputting the product profiles of one or more other products, from the listing of products that are separate from the target product, into one or more machine learning models, a first subset of product profiles that share product characteristics with a product profile of the target product;

generate, by the set of one or more processors and via the one or more machine learning models, an embedding vector of the product profile of the target product and a set of embedding vectors of one or more product profiles within the first subset of product profiles;

compute, by the set of one or more processors and based at least in part on the one or more machine learning models generating the embedding vector and the set of embedding vectors, distances between the embedding vector of the product profile of the target product and the set of embedding vectors of the one or more product profiles within the first subset of product profiles to obtain similarity scores between the product profile of the target product and the first subset of product profiles, the similarity scores indicating a subset of products, from the one or more other products, corresponding to the product profiles in the first subset of product profiles that have respective similarity scores above a scoring threshold;

augment, by the set of one or more processors and at the database that stores the data matrix comprising the listing of products associated with the product profiles, the historical electronic activity of the target product with the historical electronic activity of products within the subset of products indicated based at least in part on the similarity scores to obtain an indication of boosted historical electronic activity of the target product wherein the operation to augment the historical electronic activity of the target product further comprises operations to:

weight a boosting factor for each product of the subset of products used to obtain the historical electronic activity of the target product based on the similarity score between the product and the target product; and copy, into a first product entry associated with the target product that is stored within the database, the historical electronic activity of the products in the subset of products that are stored in one or more second product entries within the database, and wherein the boosted historical electronic activity of the target product is obtained based at least in part on copying the historical electronic activity of the products in the subset of products into the first product entry;

calculate, by the set of one or more processors, association values between the augmented target product and the products in the subset of products that indicate a relationship between the augmented target product and the products in the subset of products, the association values being calculated based at least in part on a comparison between the boosted historical electronic activity of the augmented target product and the historical electronic activity of the products in the subset of products;

generate, by the set of one or more processors and for at least the augmented target product, a sorted list of products that complement the augmented target product, the sorted list of products including one or more products from the subset of products that have an association value with the augmented target product that are greater than or equal to an association value threshold; and return, from the server and to the user interface of the user system over the network and in response to the recommendation request, product recommendations based at least in part on the sorted list of products that complement the augmented target product, the product recommendations indicating the one or more products with respective association values that satisfy the association value threshold and complement the augmented target product.

8. The apparatus of claim 7, wherein:

the first product entry is from the product entries within the data matrix that is stored within the database, the first product entry associated with the target product stores the historical electronic activity of the target product, and copying the historical electronic activity of the products in the subset of products into the first product entry associated with the target product includes combining the historical electronic activity of the products in the subset of products with the historical electronic activity of the target product to obtain the boosted historical electronic activity.

9. The apparatus of claim 7, further comprising instructions for using multi-label classification models as the one or more machine learning models, the multi-label classification models comprising at least one of k-nearest neighbors, decision trees, kernel methods for vector output, and neural networks.

10. The apparatus of claim 7, wherein augmenting the historical electronic activity of the target product further comprises calculating an average historical electronic activity across the products within the subset of products from the one or more other products indicated via the first subset of product profiles that have a highest similarity score, and augmenting the historical electronic activity of the target product using the average historical electronic activity.

11. The apparatus of claim 7, wherein receiving the recommendation request is based at least in part on inferring the recommendation request based at least in part on user electronic activity, including clicking on the target product in an advertisement or during an online shopping session.

12. The apparatus of claim 7, wherein the recommendation request is received based at least in part on an explicit user request entered into a browser or an application.

13. A non-transitory machine-readable storage medium that provides instructions that, if executed by a set of one or more processors, are configurable to cause said set of one or more processors to perform operations comprising:

receiving, from a user via a user interface of a user system over a network, a recommendation request that comprises an indication of a target product and a request for at least one product that complements the target product;

accessing, from a database and in response to receiving the recommendation request from the user, a data matrix comprising a listing of products that are associated with product profiles, the data matrix, that is within the database, having product entries that store historical electronic activity of various users related to respective products within the listing of products;

automatically detecting, in response to the recommendation request and based at least in part on accessing the data matrix, that the historical electronic activity for the target product is below a threshold; and initiating, automatically and in response to detecting the historical electronic activity for the target product is below the threshold, a process to increase a density of the historical electronic activity for the target product, wherein the process comprises:

identifying, based at least in part on inputting the product profiles of one or more other products, from the listing of products that are separate from the target product, into one or more machine learning models, a first subset of product profiles that share product characteristics with a product profile of the target product;

generating, via the one or more machine learning models, an embedding vector of the product profile of the target product and a set of embedding vectors of one or more product profiles within the first subset of product profiles;

computing, based at least in part on the one or more machine learning models generating the embedding vector and the set of embedding vectors, distances between the embedding vector of the product profile of the target product and the set of embedding vectors of the one or more product profiles within the first subset of product profiles to obtain similarity scores between the product profile of the target product and the first subset of product profiles, the similarity scores indicating a subset of products, from the one or more other products, corresponding to the product profiles in the first subset of product profiles that have respective similarity scores above a scoring threshold;

augmenting, at the database that stores the data matrix comprising the listing of products associated with the product profiles, the historical electronic activity of the target product with the historical electronic activity of products within the subset of products indicated based at least in part on the similarity scores to obtain an indication of boosted historical electronic activity of the target product wherein augmenting the target product and the historical electronic activity of the target product further comprises:

weighting a boosting factor for each product of the subset of products used to obtain the historical electronic activity of the target product based on the similarity score between the product and the target product; and copying, into a first product entry associated with the target product that is stored within the database, the historical electronic activity of the products in the subset of products that are stored in one or more second product entries within the database, and wherein the boosted historical electronic activity of the target product is obtained based at least in part on copying the historical electronic activity of the products in the subset of products into the first product entry;

calculating association values between the augmented target product and the products in the subset of products that indicate a relationship between the augmented target product and the products in the subset of products, the association values being calculated based at least in part on a comparison between the boosted historical electronic activity of the augmented target product and the historical electronic activity of the products in the subset of products;

generating, for at least the augmented target product, a sorted list of products that complement the augmented target product, the sorted list of products including one or more products from the subset of products that have an association value with the augmented target product that are greater than or equal to an association value threshold; and returning, to the user interface of the user system over the network and in response to the recommendation request, product recommendations based at least in part on the sorted list of products that complement the augmented target product, the product recommendations indicating the one or more products with respective association values that satisfy the association value threshold and complement the augmented target product.

14. The non-transitory machine-readable storage medium of claim 13, wherein:

the first product entry is from the product entries within the data matrix that is stored within the database, the first product entry associated with the target product stores the historical electronic activity of the target product, and copying the historical electronic activity of the products in the subset of products into the first product entry associated with the target product includes combining the historical electronic activity of the products in the subset of products with the historical electronic activity of the target product to obtain the boosted historical electronic activity.

15. The non-transitory machine-readable storage medium of claim 13, further comprising using multi-label classification models as the one or more machine learning models, the multi-label classification models comprising at least one of k-nearest neighbors, decision trees, kernel methods for vector output, and neural networks.

16. The non-transitory machine-readable storage medium of claim 13, wherein augmenting the historical electronic activity of the target product further comprises calculating an average historical electronic activity across the products within the subset of products from the one or more other products indicated via the first subset of product profiles that have a highest similarity score, and augmenting the historical electronic activity of the target product using the average historical electronic activity.

17. The non-transitory machine-readable storage medium of claim 13, wherein receiving the recommendation request is based at least in part on inferring the recommendation request based at least in part on user electronic activity, including clicking on the target product in an advertisement or during an online shopping session.

* * * * *